United States Patent
Cain

[11] Patent Number: 5,406,934
[45] Date of Patent: Apr. 18, 1995

[54] HEAT RECOVERY APPARATUS FOR USE WITH A NON-HIGH EFFICIENCY FURNACE

[75] Inventor: John S. Cain, Mequon, Wis.

[73] Assignee: Cain Industries, Inc., Germantown, Wis.

[21] Appl. No.: 35,845

[22] Filed: Mar. 23, 1993

[51] Int. Cl.⁶ ............................................. F24H 3/12
[52] U.S. Cl. ................................. 126/117; 165/901; 126/110 R; 237/55; 122/20 B
[58] Field of Search ............ 165/901; 126/117, 110 R; 237/55; 122/20 B

[56] References Cited

U.S. PATENT DOCUMENTS

| | | | |
|---|---|---|---|
| 4,194,558 | 3/1980 | Goosman | 122/20 B |
| 4,318,367 | 3/1982 | Antonucci | 122/20 B |
| 4,371,111 | 2/1983 | Pernosky | 122/20 B |
| 4,392,610 | 7/1983 | Moskal | 237/55 |
| 4,401,261 | 8/1983 | Brown | 237/55 |
| 4,408,716 | 10/1983 | Rockwell | 237/55 |

Primary Examiner—Carroll Dority
Attorney, Agent, or Firm—Wheeler & Kromholz

[57] ABSTRACT

A heat recovery apparatus for increasing the efficiency of a furnace having a cold air return, a burner, a hot air outlet, and a hot air exhaust. The heat recovery apparatus comprising a finned coiled heat exchanger located in the exhaust and having a water inlet and a water outlet. The water outlet connected via a silicone tube to a second water inlet on a core heat exchanger located in the cold air return. The core heat exchanger having a water outlet connected via second silicone tube to a water reservoir tank. The water reservoir tank containing water and a pump submerged within the water. The pump having a third water inlet and a third water outlet. The third water outlet being connected via a third silicone tube to the water inlet of the coiled heat exchanger. The heat recovery apparatus increasing the efficiency of a non-high efficiency furnace.

7 Claims, 2 Drawing Sheets

HEAT RECOVERY APPARATUS FOR USE WITH A NON-HIGH EFFICIENCY FURNACE

BACKGROUND OF THE INVENTION

The present invention relates generally to the field of heat recovery systems for recovering heat from a furnace that is used in a home or building. Specifically the invention is designed to retrofit older warm air furnaces that are not of the high efficiency type. The present invention allows a home owner the ability to increase the efficiency of his or her furnace without having to buy an entire new furnace system; e.g. a high efficiency furnace system. This saves the consumer money and the community energy.

The inventor knows of no prior art that teaches or shows the unique and simple design of the present invention.

SUMMARY OF THE INVENTION

The invention is a heat recovery apparatus for increasing the efficiency of a non-high efficiency furnace. The typical furnace, which the present invention is normally used in combination with, is for heating air in a building and has a heat input of not less than 80,000 Btu/hr and not more than 140,000 Btu/hr. The furnace must be a non-high efficiency furnace (80% efficiency or less) having a twenty-four (24) inch or longer straight exhaust duct that is four (4) to six (6) inch diameter, and an eight (8) inch by twenty (20) inch cold air return duct (cross sectional area).

The furnace has a cold air return that acts as a means for returning cold air from the house or building to the furnace, a heater or burner that acts as a means for heating the air from the cold air return and which directs the now hot air to a hot air outlet that acts as a means for supplying hot air to the building, and an exhaust means for removing hot contaminated exhaust air from the furnace and the building. The apparatus of the present invention comprises a first heat exchanger, mounted in the exhaust means, having a heated liquid outlet and a cooled liquid inlet; the heated liquid outlet being connected via a conduit means, typically silicone tubing, for conveying liquid to a second heat exchanger, mounted in the cold air return means, at a heated liquid inlet. The second heat exchanger further including a cold liquid outlet connected to a liquid holding tank means for holding liquid and containing a pump means, having a liquid inlet and a liquid outlet, for pumping liquid, submerged within the liquid. The liquid outlet is connected to the cooled liquid inlet of the first heat exchanger.

Alternatively, the present invention may be provided with a water bypass control assembly that includes a plurality of tubing clamp valve means designed to control flow and maintain a desired minimum water temperature in the tank. The control of the water temperature in the tank is designed to be dependent upon a point of no condensation developing in the flue exhaust where the coil assembly is located.

The water bypass control assembly should be used with the present invention in situations where the furnace is of a type that is very poor firing or does not completely burn all the natural gas fuel that it uses. In these types of furnaces there is a potential for condensation on the coil assembly. Such condensation is indicative of an unacceptable temperature within the exhaust and thus it must be eliminated by elevating the temperature of the water entering the coil assembly. The colder the water entering the coil assembly relative to the poor combustion of the furnace, the greater the potential of condensation in the coil assembly. Potential condensation can be alleviated by adjusting the valves to divert some of the warm water from the core assembly to the coil assembly thereby providing a means for temperature control of the water in the coil assembly. The normal operating temperature of the water in the tank should be about 120 degrees Fahrenheit or 48 degrees Celsius. Controlled water temperature assures that no condensation can form in the coil assembly.

These and other benefits of the present invention will be apparent to one skilled in the art from the following description.

DETAILED DESCRIPTION

Figure 1:
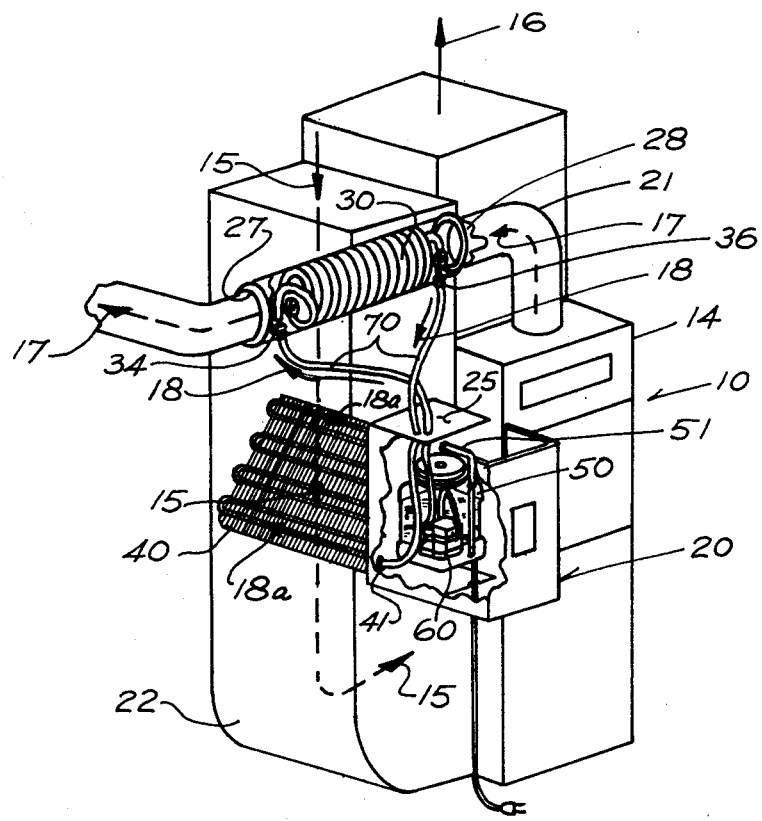
FIG. 1 is a cutaway perspective view showing the present invention in conjunction with a furnace.
Figures 2, 3:
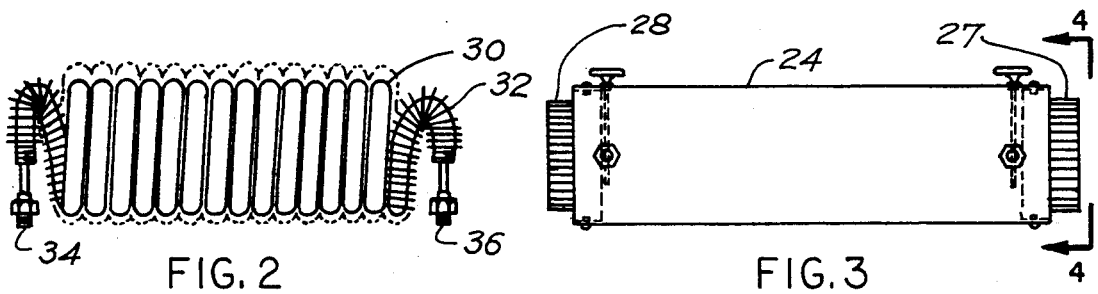
FIG. 2 is a perspective view of the first heat exchangers.
FIG. 3 is a perspective view of the portion of the exhaust means that contains the first heat exchanger with the temperature probes being shown in phantom.
Figure 4:
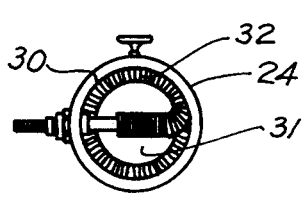
FIG. 4 is a view from line 4—4 of FIG. 3.
Figure 5:
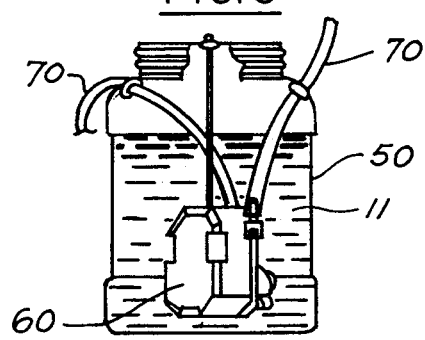
FIG. 5 is a cutaway perspective view showing the reservoir tank and the pump of the present invention.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Please refer to FIGS. 1-5. As previously noted the present invention 10 is specifically designed for retrofitting warm air furnaces 14 that are not of the high efficiency type. Conventional heat recovery systems include a heat exchanger assembly, a circulating pump, exhaust thermometers, a pump controller, a temperature and pressure relief valve, a check valve, and a float control valve. However, the present invention 10 substitutes the pump controller, temperature and pressure relief valve (T&P valve), check valve, and float control valve components with a packaged heat exchanger assembly 20.

This assembly 20 comprises two heat exchangers 30 and 40 (a tinned coil assembly 30 and a core assembly 40), a reservoir or tank 50 that is at atmospheric pressure, a circulating pump 60, and interconnecting silicone tubing 70 which completes a self-contained atmospheric circulating system. The result is an assembly 20 that completes a unique "runaround" water flow system. The coil assembly 30 safely recovers the heat from the exhaust 21 of the furnace 14 and the core exchanger 40 transfers that heat by preheating the cold air in cold air return 22.

Still referring to FIG. 1, arrows 15 show the direction of cold air flow in the cold air return 22, the arrows 16 show the direction of hot air flow, the arrows 17 show the direction of the hot exhaust air flow, and the arrows 18 show the circulation or run around path of the water 11 between the coil exchanger 30 and the core exchanger 40.

As a result of the new design the present invention 10 has several advantages over previously known devices. For example, the stainless steel internal bypass typically found in known devices is now removed. The result is that the exhaust flow 17 now passes straight through the center 31 of the coil assembly 30. (See FIG. 2) Accordingly, the finned tubing 32 (see FIGS. 2 and 4) of the coil assembly heat exchanger 30 recovers less heat (Btus per hour), instead of receiving the full diverting flow through the finned tubing, which is the present flow pattern in known units. Because the internal bypass has been removed, the friction loss on the exhaust side 21 is further reduced below the minimum industry safety standards, which known units already meet.

Further, the stainless steel hinged access panels and carbon steel lid assembly of previously known heat recovery units are replaced with standard galvanized sheet metal duct 24. This is because immediate accessibility is not required. Since the coil assembly 30 is in contact with the same heating/cooling and exhaust forces as the existing galvanized sheet metal had been in contact with the past, galvanized sheet metal duct casing is sufficient. The result is that the invention 10 can be made of relatively light weight material and thus be installed much easier and in all positions from horizontal through vertical exhaust flows.

Also the design of the present invention 10 includes its own controlled heat sink (core assembly 40) which replaces the pump controller, T&P relief valve, flow control valve, check valve components with a combination heat exchanger core/tank/pump assembly. The core assembly 40 is mounted in the cold air return 22 of the warm air furnace 14, where the heat recovered from the exhaust 21 is exchanged.

Previous such devices using a heat exchanger, circulating pump, thermometers, pump controller, T&P relief valve, flow control valve, and check valve used a general flow system that circulated water as the heat exchange medium from the heat recovery unit (typically referred to as an economizer) to a variety of water heat sink types. As a result, these previous heat sinks were uncontrolled and included variables such as water flow rates, cold water temperatures, operating pressures, PSIG loss and water flow direction. The variables inherent in those previously known devices required a pump controller, T&P relief valve, flow control valve, and a check valve in order to maintain a minimum exhaust temperature leaving the economizer of 260 degrees Fahrenheit.

The present invention 10 does not require this additional structure and produces a controlled system of circulating water from—the pump 60 submerged in a one gallon tank reservoir 50 to—the heat recovery coil assembly 30 in the exhaust 21 breaching to the core assembly 40 in the cold air return 22 to completing the circuit and returning back to the atmospheric reservoir tank 50. Accordingly, the controlled system allows for the ability of absolute maintenance of a minimum exhaust temperature leaving the furnace 14 of at least 260 degrees Fahrenheit; that temperature being the minimum temperature necessary to properly exhaust bad air from the furnace 14.

This results in the advantage that no temperature control is required in the present invention 10. The combination of the core assembly 40 located in the cold air return 22 and coil assembly 30, located in the exhaust 21 allows for total control of water temperatures, water flow, heat (Btu per hour) transfer, and a minimum of 260 degrees Fahrenheit leaving the coil assembly 30. As a result, a pump controller, normally required for minimum exhaust temperature control and condensation control, is not necessary. Further, no flow valve control is required because the total dynamic head loss on the water side and pump capacity presets the optimum water flow rate. This in conjunction with the required 260 degrees Fahrenheit minimum outlet exhaust performance does not require the flow control valve. Also, no check valve is required because the circulating pump 60, discharges water through essentially open tubing 70 with no obstructions into an atmospheric tank 50. Consequently, flow direction cannot be changed. Finally, no temperature/pressure relief valve is required because there are no valve or potential obstructions in the system. Combining a maximum pump discharge head loss of six feet and a final water discharge into the atmospheric tank 50 does not require any physical or theoretical reason for a pressure relief valve.

Further, because the end of water flow circuit is in the atmospheric tank 50 the water temperature can never rise above 210 degrees Fahrenheit or its boiling point because it is continuously being cooled by its passage through the core assembly 40.

Finally, the present invention 10 has the added advantage of being an essentially self-contained run around water flow system and thus can be operated on less than one gallon of distilled water 11 as the heat transfer medium. While many other types of liquids could be used distilled water 11 is preferred as providing a cheap heat transfer medium having a relatively wide temperature range and reducing any potential scale buildup within the system.

The present invention 10 works in the following manner:

Heat measured in the form of Btu/hour, is transferred from the exhaust 21 of a warm air furnace 14 to the water 11 in the coil assembly 30. The portion of the heat recovered is then transferred to the core assembly 40, from there it is passed into the cold air of the cold air return 22.

The coil assembly 30 is a heat exchanger that is limited to lowering the exhaust temperature to a minimum of 260 degrees Fahrenheit while recovering Btu (heat) and the other exchanger is the core assembly 40 which immediately heats up the cold air in the cold air return 22 that is entering the furnace 14 with the recovered Btu (heat). The core assembly 40 is connected to the tank 50 which contains one gallon of water 11 and a submerged circulating pump 60 operating under atmospheric conditions. Please note that, while the use of water is specifically disclosed, other fluids or liquids could be used as the heat transfer material.

Both heat exchangers 30 and 40 are interconnected with 7/16 inch outside diameter high temperature silicone tubing 70. The circulating pump 60 operates on standard 120 volt, 60 Hertz current and uses only 22 watts of energy to continually pump 0.56 GPM (gallons per minute) to the coil assembly 30, then the core assembly 40 and finally back to the tank 50.

The core assembly 30 is limited in its quantity of heating surface to recover no more than a predetermined amount of the total heat (Btu per hour) available in the exhaust 21 under normal operation. As a result it can reduce the exhaust temperature to no lower than 260 degrees Fahrenheit under normal operation. This is necessary because removal of all the heat or an excessive amount of heat, from the exhaust air, will prevent the exhaust air from properly being voided from the system and adversely affect the operation of the entire furnace 14.

When the temperature of the water 11 contained within the invention 10 is raised in the coil assembly 30, from approximately 130 degrees Fahrenheit to 160 degrees Fahrenheit by the heat of the exhaust air, it then enters the core assembly 40 where the cold return blower of the furnace 14 blows cold air over the core assembly 40 and cools the water 11 from 160 degrees Fahrenheit back down to 130 degrees Fahrenheit and preheats the air approximately seven to ten degrees Fahrenheit (depending on the blower volume). The cooled water 11 returns to the tank 50 at an approximate temperature of 130 degrees Fahrenheit and the pump 60 continues the circulating cycle back to the coil 30.

Installation of the present invention 10 is simple. Essentially the invention 10 is divided into two component assemblies: the coil assembly 30 and the core assembly 40. Installation in a typical furnace can be done in just over an hour. After the power to the furnace is switched off, the coil assembly 30 is installed within the existing four to six inch diameter sheet metal exhaust duct 25 in a convenient area located between the immediate exit of the furnace to the chimney connection. The core assembly 40 is installed along the narrow side of the cold air duct 22, and as close to the location of the coil assembly 30 as possible. The two 48 inch long interconnecting silicone tubes 70 extending out of the housing 25 are connected to inlet and outlet water connections 34 and 36 on the coil assembly 30 (excess tubing length is removed). The plastic tank 50 is filled with distilled water 11 to a predetermined operating level and the circulating pump 60 is actuated for constant non-interruptable water flow. The power to the furnace 14 is then switched back on for normal furnace operation and the installation is complete.

The present invention operates in conjunction with the furnace as follows:

When the thermostat calls for the burner to fire the excess exhaust heat is transferred to the coil assembly 30 and the water 11 begins to pick up heat. Since the pump 60 is continually circulating water 11 the heat normally exhausted is transferred to the water 11 as it circulates. Under normal furnace operation, when the burner fires, the furnace chamber temperature will rise quickly (within a few minutes) to the point where the temperature control plenum switch of the furnace blower begins to operate. The heat recovered from the coil assembly 30 is now transferred by circulating water 11 to the core assembly 40. The core assembly 40 absorbs and transfers this heat to the air in the cold air return 22 so that the air is continually preheated prior to entering the furnace 14. As the furnace 14 continues to operate, the inlet exhaust temperature to the coil assembly 30 continues to rise until leveling off at its normal operating exhaust temperature.

The submerged pump 60, circulates heated water; ranging from 120 degrees to 130 degrees Fahrenheit to the coil assembly 30 where it is heated to a range of 150 degrees to 160 degrees Fahrenheit depending on exhaust air temperature surrounding the coil assembly 30. The 120 degree to 130 degrees Fahrenheit water enters near the exhaust outlet connection 27 and leaves the coil assembly 30 near the exhaust inlet connection 28 in order to obtain optimum counterflow heat transfer and maximize theoretical entering temperature differences. This increases the efficiency of the entire system. The 150 to 160 degree Fahrenheit water leaves the coil assembly 30 and immediately enters the lower connection 41 of the core assembly 40 moving in a serpentine flow pattern 18a upward an optimum predetermined incline. This incline is typically about 45 degrees. The cooled water 11 exits the core heat exchanger 40 immediately back into the tank or reservoir 50, through the discharge tube 51, at a reduced temperature of roughly 120 to 130 degrees Fahrenheit and the water flow cycle is completed.

The major volume of return air passes through the core heat exchanger 40 at 65 degree to 70 degrees Fahrenheit. Internal cooling of the 150 to 160 degree Fahrenheit water and raising the return air temperature an average 7 to 10 degrees Fahrenheit. The preheated return air now enters the furnace approximately 7 to 10 degrees Fahrenheit warmer than under normal operating conditions. Thus, the efficiency of the furnace 14 is improved.

It is also important to note that when the thermostat cycles the furnace burner off, the coil assembly 30 continues to recover heat from high temperatures as the hot air vents from the furnace 14 until the temperature control plenum switch cycles the blower off. The majority of this heat is not combustion exhaust but rather residual heat which is also available for recovery. This heat rises slowly out of the furnace 14 during the cool down cycle and is immediately recovered. When the exhaust temperature falls below 250 degrees Fahrenheit and the circulating pump 60 continues to circulate water 11 so that residual heat is recovered (no combustion at this point and therefore no potential condensation) and immediately exchanges it at the core assembly 40 where it preheats the cold air return. This all takes place until the cold air return blower cycles off. This further increases the efficiency of the furnace 14.

It should be noted that as the furnace 14 operates in conjunction with the present invention 10, the coil and core heat exchanger assemblies 30 and 40 have no effect on the combustion or cold air blower assembly of the furnace 14. Under the same heating requirements the only overall effect that of the present invention 10 does have on the furnace is that the furnace 14 doesn't stay on as long given the same heating requirements simply because the heating needs are met sooner.

Empirical data and visual monitoring have shown that no condensation forms on the coil heat exchanger 30 or any portion of either the coil heat exchanger housing 25 or within the surrounding exhaust duct 21 at any time. Essentially the present invention 10 is a system combined with the proper coil/core design heat exchange system, vessel volume, water flow, temperature balance, and instantaneous water heating from the exhaust, together cause the water to be warm enough at all times to keep the exterior surface of the coil assembly 30 dry at all times.

Because the water flow rate is 4.7 pounds per minute and total volume in the coil 30 is 18.2 cubic inches or 0.079 gallons or 0.63 pints, the water 11 is instantaneously heated and stays sufficiently heated during the off cycles. Even with initial water temperatures entering the coil 30, at an initial start up temperature below 70 degrees Fahrenheit, no measurable condensate has been observed to form. This is attributed to the fact that the design of the coil 30 has insufficient volume, water flow, or time, to cause the formation of any condensation.

Also, given the square footage of the coiled heat exchanger 30 (a 316 stainless steel tube with aluminum fins 32 that are metallurgical bonded to the tube) contained within the coil assembly 30, there is a design quantity available to reduce the exhaust temperature to not less than 260 degrees Fahrenheit.

The quantity of heating surface relative to the minimum 80,000 Btu per hour burner input is the most susceptible to the possibility of condensation. But given its exhaust flow rate and its temperature, there is only enough heating surface to transfer a predetermined amount of heat (Btu per hour) which is less than the total available. In the present case of 80,000 Btus per hour input burner or the smallest burner which the present invention is limited to retrofit, the ratio of the quantity of heating surface to exhaust flow rate is the greatest proportion.

Empirical data has shown the heat transfer rate, relative to the reduction of the exhaust temperature, to reduce the temperature to no lower than 260 degrees Fahrenheit. Consequently, the exhaust temperature leaving the maximum size burner (140,00 Btu per hour input), to which the present invention is applicable, can only be reduced to 310 degrees Fahrenheit.

Furnace cycling periods during a heating season affect the present invention 10 as follows:

The heated water, at or above a minimum temperature of 70 degrees Fahrenheit, flows through the coil assembly 30 and does not allow the potential for condensation to occur. During a heavy heating period of the year where the furnace on time is longest and the intervals between the burner firing are at their shortest cycle, the average water temperatures entering the coil assembly 30 range from 120 degrees to 130 degrees Fahrenheit. During the beginning and end periods of the heating season when the burner is firing with less cycles for shorter periods of time, the average water temperature entering the coil assembly 30 can range from 85 to 105 degrees Fahrenheit during the entire heating season, the water temperature in the coil assembly 30 is maintained warm enough so as to not allow condensation and corrosion to occur. During the extended intervals between burner on times and also during the summer season when the burner does not fire at all, the water temperature is maintained between 75 and 80 degrees Fahrenheit. This is as a result of the heat given off by the submerged circulating pump 60 and the summer ambient air conditions. Accordingly, any condensation which theoretically might have a tendency to occur within the coil assembly 30 especially at the inlet water connection of the coil 30 or in the exhaust duct 21 does not occur.

Also important is the plenum switch of the furnace 14. This switch acts indirectly with the core/coil assembly 40/30. The plenum switch and the coil/core assembly 40/30 operates in unison with the same objectives as previously noted and as required by manufacturing standards. In particular it should be noted that known prior art devices, other than the gravity heat exchange type, are provided with a temperature control which will not allow an air fan or water flow control to operate unless the flue temperature at the outlet collar of the device is at least 250 degrees Fahrenheit. The objective of this manufacturing requirement, where the circulating pump fan or cannot operate below 250 degrees Fahrenheit, is to ensure that no condensation will form.

The present invention 10 meets this underlying objective without the temperature control.

The requirement of a temperature on/off pump controller in a furnace retrofit application serves no function nor does it have any effectiveness especially when the pump it would control is only 1/150 of a horse power and pumps less than a pint per minute as does the pump 60 of the present invention 10. The water 11 it does pump operates slightly above what a gravity flow might be, in that it is required to overcome a six foot friction head. This very small diameter flow system is completely controlled by the nature of its own design and is indirectly coupled with an already existing plenum switch.

Known heat sinks such as preheating boiler feed water, hot water return, processed water, swimming pool water, domestic water, etc. are all larger and have uncontrolled existing conditions which have to be individually addressed and then controlled. Because of these conditions they all require a temperature on/off pump controller. This is not required in the present invention 10.

The present invention 10 is designed only for the furnace which combines the use of a furnace plenum switch, control of the heat sources and controlled heat sinks. The existing plenum switch found on all furnaces operates with the same objectives, and works better than an on/off pump sequencing control which is presently used on other heat recovery apparatus. The plenum switch controls the on/off blower motor for the cold air return 22 at the proper heating temperature cycle. It is designed to avoid condensation while at the same time it keeps the furnace from overheating. The plenum switch causes the cold air flow to turn on or off. Therefore, instead of a temperature pump controller being used to turn the pump on or off the present invention relies upon the plenum control switch to aid in condensation control and thus removes the present requirement of an on/off pump sequencing control for operating the pump controller.

The present invention 10 is unique unto itself. The requirement for a temperature dependent on/off pump sequencing controller found in prior art mechanisms does not serve the purpose of avoiding condensation by controlling a 1/150 horse power pump. Therefore it can be eliminated. There are two main reasons for this:

1. There is already a plenum switch on the furnace 14 which helps serve the same theoretical purpose as a pump controller.

2. The totally controlled heat source/heat sink design of the present invention 10 allows no condensation to develop in a properly firing furnace 14.

Figure 6:
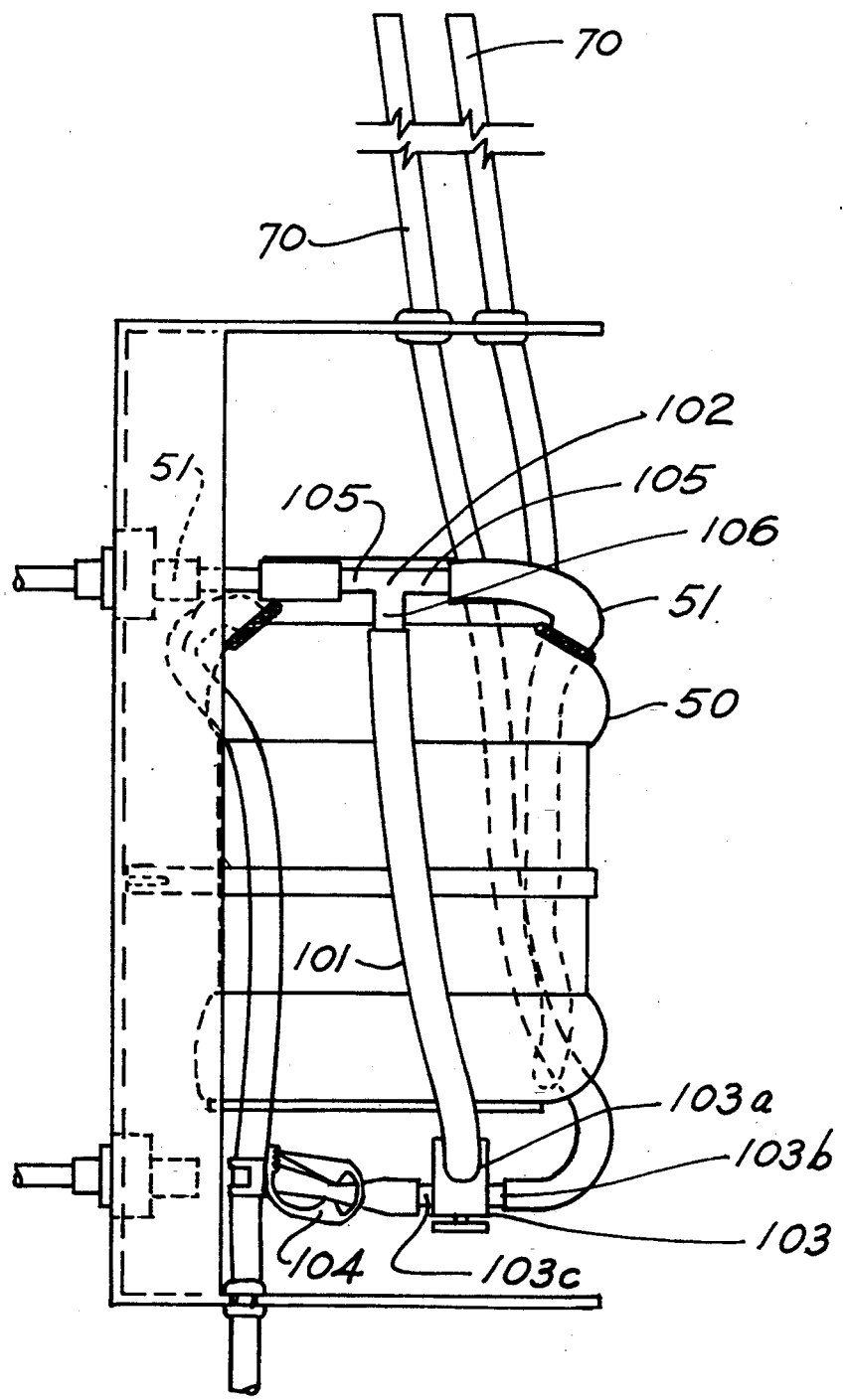
FIG. 6 is a side elevational view of the alternative embodiment of this invention showing the tubing clamp valves.

Finally, referring to FIG. 6, the invention 10 may alternatively include a tube assembly 100. This assembly 100 includes the silicone tubes 70, a bypass tube 101, a T or Y shaped conduit 102, a small bypass valve 103, and a large flow control valve 104.

As may be seen by looking at FIG. 6, the arms 105 of the T or Y shaped conduit 102 are connected to the discharge tube 51 from which the water 11 from the core assembly 40 is discharged into the tank 50. The base 106 then has one end of the bypass tube 101 connected to it. The other end of the bypass tube is then connected to an opening 103a of the small bypass valve 103.

The alternative structure shown in FIG. 6 is for modification of the present invention 10 for use with poor firing furnaces. As noted above, it is important that condensation not develop on the coil assembly 30. The potential for condensation on the coil assembly 30 is increased when the furnace used has poor firing or gas burning characteristics.

Accordingly, if during the initial start up or at some other time during the life of the furnace 14, condensation is detected, it can be eliminated simply elevating the temperature of the water entering the coil assembly 30. The colder the water entering the coil assembly 30 relative to poor combustion within the furnace, the greater the potential for condensation on the coil assembly 30. Potential condensation can be alleviated by adjusting the valves 103 and 104 for higher water temperature control. The normal operating temperature of the water 11 in the tank 50 should be about 120 F. This controlled temperature assures that no condensation can form in the coil assembly 30.

As may be seen in FIG. 6, The small valve 103 is located beneath the tank 50, attached to the bypass tubing 101 and is set in the normally closed position. This positioning of the small valve assures full water flow to pass through the large valve 104, located at the inlet of the core assembly 40 and set in the normally open position.

If evidence of condensation is present during initial startup, the small valve 103 should be set to the normally open position. The large valve 104 should then be adjusted to begin restricting the water flow to the core assembly 40. Begin the adjustment of the large valve 104 by slightly restricting the flow of water 11 through this valve 104. This adjustment will immediately begin to divert a portion of the heated water through the bypass tubing 101 and into the tank 50. As a result, the water temperature in the tank will begin to rise and signs of condensation will soon diminish. After 5–10 minutes of burner operation, the tank temperature will be maintained at a higher point.

Repeat the process of diverting more heated water 11 to the tank 50, by increasing the flow restriction, as required. One click of the large valve 104 every 5–7 minutes will continue to increase the temperature of the water 11 in the tank 50, until there are no signs of condensation on the coil assembly 30. However, it is important to note that it is best not to close the large valve 104 completely so as to avoid overheating the tank 50.

The foregoing is considered as illustrative only of the principles of the invention. Furthermore, since numerous modifications and changes will readily occur to those skilled in the art, it is not desired to limit the invention to the exact construction and operation shown and described.

What is claimed is:

1. A heat recovery apparatus for increasing the efficiency of a furnace, the furnace having a cold air return means for returning cold air to the furnace, a heating means for heating the air from the cold air return means, a hot air outlet means for supplying hot air to a building, and an exhaust means for removing hot contaminated air from the furnace and the building, the apparatus comprising:
   a first coiled and tinned heat exchanger mounted within the exhaust means having a heated liquid outlet and a cooled liquid inlet;
   the heated liquid outlet connected by a first conduit to a second heat exchanger, mounted in the cold air return means, at a heated liquid inlet;
   the second heat exchanger further including a cooled liquid outlet connected by a second conduit to a liquid holding tank;
   a continuously circulating pump submerged within the liquid holding tank, the pump having a pump liquid inlet and a pump liquid outlet;
   the pump liquid outlet connected by a third conduit to the cooled liquid inlet of the first heat exchanger.

2. The heat recovery apparatus of 1 in which the liquid is water.

3. The heat recovery apparatus of 1 in which the second heat exchanger is a core heat exchanger.

4. The heat recovery apparatus of 1 in which the pump is a continuously running 1/150 horse power pump.

5. A heat recovery apparatus for increasing the efficiency of a furnace, the furnace having a cold air return means for returning cold air to the furnace, a heating means for heating the air from the cold air return means, a hot air outlet means for supplying hot air to a building, and an exhaust means for removing hot contaminated air from the furnace and the building, the apparatus comprising:
   a first heat exchanger comprising a coiled tube having a plurality of finns, an outside surface, a heated liquid outlet, and a cooled liquid inlet, the plurality of finns being connected to the outside surface;
   the first heat exchanger mounted within the exhaust means;
   the heated liquid outlet connected by a first conduit to a second heat exchanger mounted in the cold air return means, at a heated liquid inlet;
   the second heat exchanger further including a cooled liquid outlet connected by a second conduit to a liquid holding tank;
   a continuously circulating pump submerged within the liquid holding tank, the pump having a pump liquid inlet and a pump liquid outlet;
   the pump liquid outlet connected by a third conduit to the cooled liquid inlet of the first heat exchanger.

6. A heat recovery apparatus for increasing the efficiency of a furnace having a cold air return duct, a heating means for heating the air from the cold air return duct, a heated air outlet for supplying hot air to a building, and an exhaust flue for removing hot contaminated air from the furnace, the heat recovery apparatus comprising:
   a tinned coiled heat exchanger located within the exhaust flue and having a coiled heat exchanger water inlet and coiled heat exchanger water outlet;
   the coiled heat exchanger water outlet connected by a first tube to a core heat exchanger water inlet of a core heat exchanger located in the cold air return duct;
   the core heat exchanger having a core heat exchanger water outlet connected by a second tube to a water reservoir tank;
   the water reservoir tank containing water and having a continuously circulating pump submerged therein;
   the pump having a pump water inlet and a pump water outlet;
   the pump water outlet connected by a third tube to the coiled heat exchanger water inlet of the tinned coiled heat exchanger;
   a bypass mechanism connected and extending between the first tube and the second tube.

7. The bypass mechanism of claim 6 including a valve mechanism.

* * * * *